Sept. 13, 1960    H. ROSEN    2,952,023
CORNEAL FABRICATION
Filed March 19, 1957    2 Sheets-Sheet 1
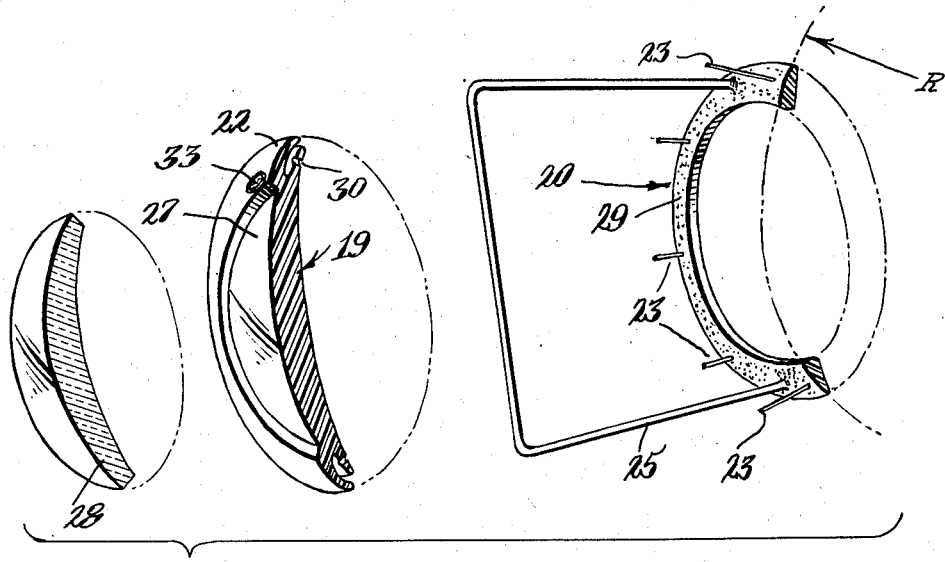
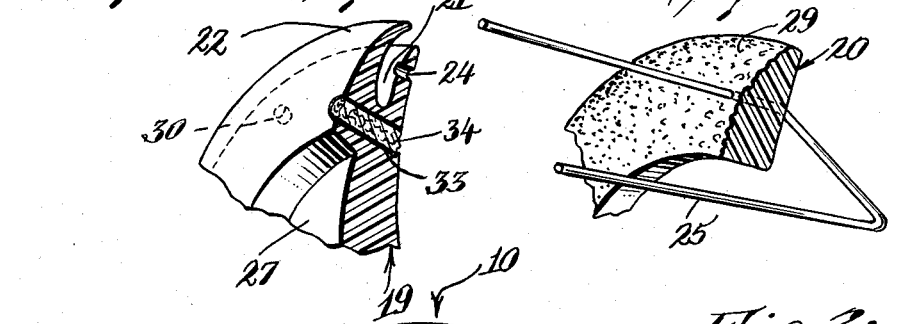
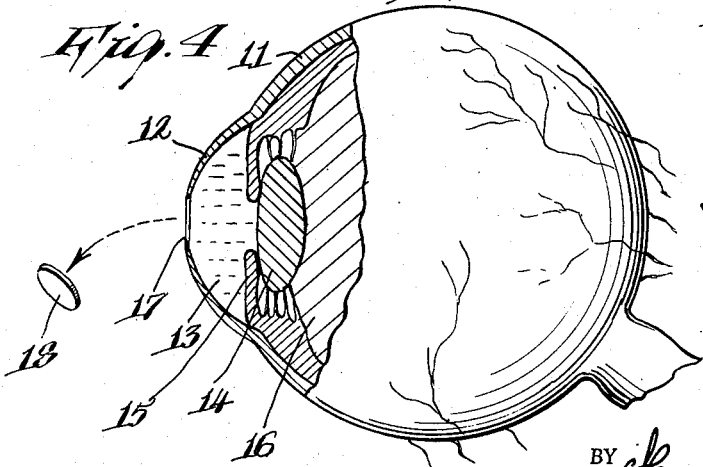
HYMAN ROSEN
INVENTOR.
BY
ATTORNEY

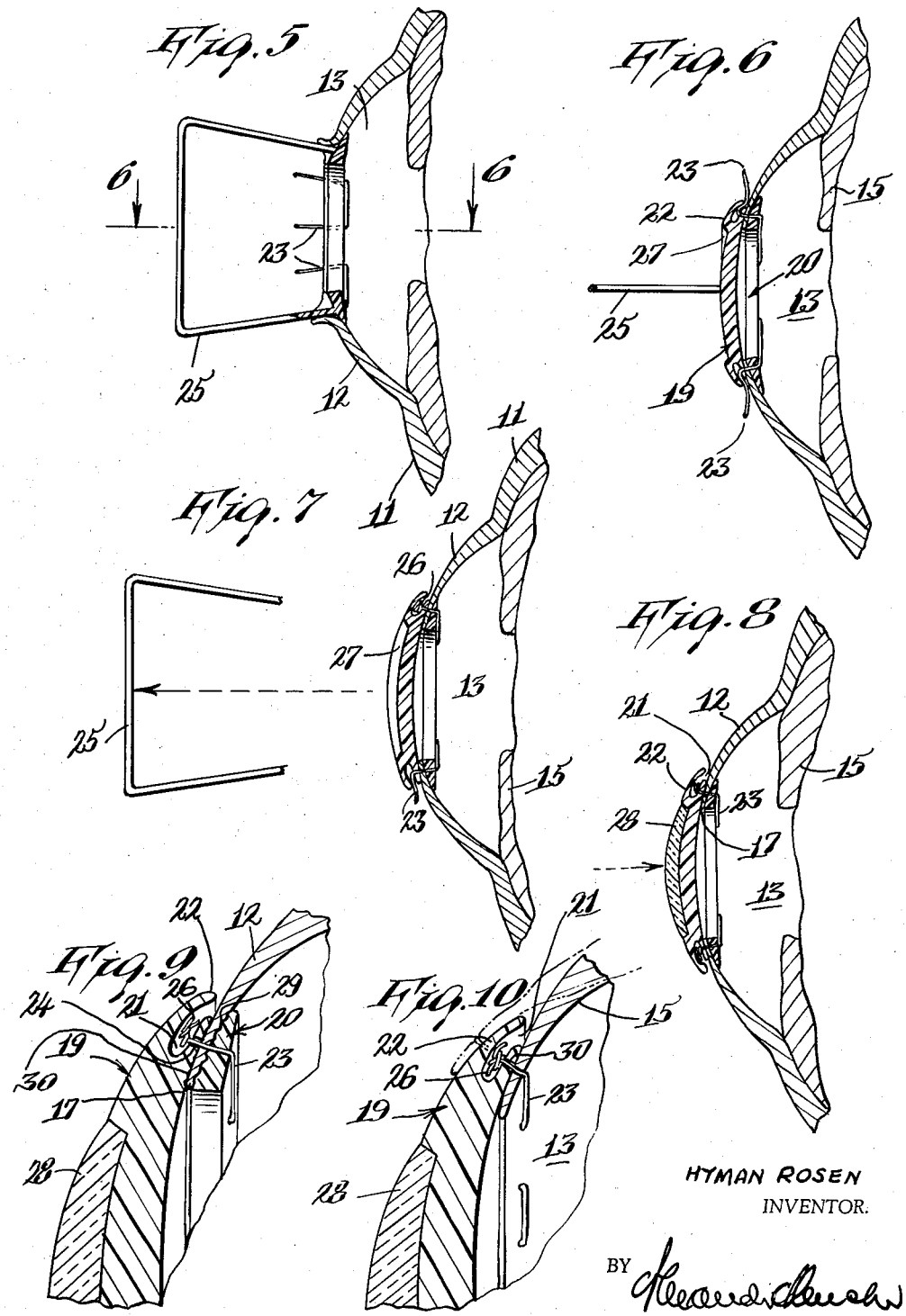

United States Patent Office 2,952,023
Patented Sept. 13, 1960

2,952,023
CORNEAL FABRICATION
Hyman Rosen, 31 Erick Ave., Hewlett, N.Y.
Filed Mar. 19, 1957, Ser. No. 647,048
2 Claims. (Cl. 3—13)

This invention relates generally to corneal corrections of the human eye, but more specifically to structure and technique for substitution of a synthetic transparent body for a removed non-functioning corneal portion when the latter is the basic or contributing cause of blindness.

This invention relies on the anatomical and physiological aspects of the corneal portion of the eye, namely, adaptability for tissue grafts for strengthening purposes, compatability with affixation thereto of foreign bodies at excised portions and ability for regeneration and repair at the periphery of said excised portions.

This invention further relies on the limited area of the cornea requiring transparency and further on the physical strength of the remainder of the cornea.

Accordingly, the main object of the invention is to provide a structure and a surgical technique for application of a synthetic transparent body as a replacement for the limited area of the cornea for functional transparency. Such structure and technique are especially feasible for non-transparent conditions of the cornea due to eye injury, infection or other cause.

A further object of the invention resides in the simplicity of technique involved in applying the structure, in the durability of function of said synthetic transparent body, and in the comfortable results derived from the utilization of the invention.

A further object of the invention resides in cooperating structure for refractive correction of the eye.

These objects and other incidental ends and advantages of the invention will hereinafter appear in the progress of the disclosure and as pointed out in the appended claims.

Accompanying this specification are drawings showing preferred structural forms of the invention and the surgical technique for practice and wherein:

Figure 1 is an exploded view partly in section showing structural parts applicable to the peripheral corneal edge adjacent a removed central section of the cornea;

Figure 2 is a fragmentary view partly in section and partly in elevation of the intermediate figure in the exploded view of Figure 1;

Figure 3 is an enlarged and fragmentary view partly in elevation and partly in section of the end figure in the exploded view of Figure 1;

Figure 3a is an enlarged fragmentary view partly in section and partly in elevation showing a modified form of the retention ring shown in Figure 3;

Figure 4 is a horizontal section through the eyeball with the essential structures and shows removal of a corneal area which requires transparency for sight;

Figure 5 is a horizontal section of the forward part of the eye showing the introduction of the retention ring under the periphery of the corneal cut-out edge;

Figure 6 is a sectional view across the plane 6—6 of Figure 5 showing the corneal substitute and synthetic body in registration with said retention ring and disposed on the outside of the cut-out edge of the cornea and in the process of affixation with the retention ring;

Figure 7 is another sectional view similar to Figure 6 showing the removal of the handling means for introduction of the retention ring within the eye;

Figure 8 is a sectional view showing the retention ring and the corneal synthetic substitute body sutured together and a further introduction of a refractive element mounted in the corneal substitute;

Figure 9 is a fragmentary sectional view showing the assembly fully operative;

Figure 10 is a sectional view showing a modification of structure wherein there is no retention ring and wherein the synthetic substitute is applicable either over or under the cut-out edge of the cornea.

In accordance with the invention and the preferred forms and technique shown, numeral 10 indicates generally the eyeball having sclera portion 11, corneal portion 12, interior chamber 13 containing the aqueous humor, the lens 14, iris 15 and vitreous body 16.

The cornea 12 as shown in Figure 4 is provided with a limited area opening 17 resulting from the surgical cut-out 18, this area at least requiring transparency for light penetration through the aqueous humor 13, lens 14 and vitreous body 16.

In order to practice the invention herein, it is essential that the concentric corneal portion beyond cut-out edge 17 be sufficiently healthy for anchorage thereto of the corneal synthetic substitute generally indicated by numeral 19. As is well known, the cornea is capable of receiving grafts very easily when the problem of transparency is not involved. Therefore, before practicing the invention herein the cornea may be strengthened from any type of compatible tissue to render the same sufficiently strong and healthy for reception of a suture and for compatability with a synthetic object.

As shown in one form of the invention, the corneal substitute 19 is mounted against the concentric portion of cornea 12 adjacent cut-out edge 17, the underside thereof having conformable radii with the cornea. The synthetic substitute 19 is adapted to be secured to a retention ring generally indicated by numeral 20 registering with the periphery of corneal substitute 19 and adapted to be disposed against the inner surface of the concentric part of the cornea adjacent cut-out edge 17 all as best shown in Figure 9. The retention ring 20 has an outer curvature conformable with the radii of the cornea and is disposed as best shown in Figure 7 within the interior chamber 13 spaced from iris 15.

The corneal substitute has the transparency of a healthy cornea and may be formed of a suitable plastic including medical polyvinyl chloride, butyl methacrylate or other inert and equivalent substances whose degree of hardness and flexibility are controllable.

Corneal body 19 is preferably provided with a peripheral groove 21 along its tapered edge 22 to receive the ends of suture elements 23 through spaced and formed openings 24 in the lower wall of groove 21. Sutures 23 may already be provided by ring 20 as shown in Figure 1 and are formed of any suitable or conventional suture material.

While introducing retention ring 20, by handle 25, the rim area of cut-out edge 17 is suitably folded back by suitable technique and means by the surgeon for ring retention. At the same time finger pressure is applied over the corneal rim area to cause penetration of the ends of sutures 23. Thereafter, body 19 is applied over the projecting suture ends for registration with body openings 24. The suture ends are now knotted, folded over or otherwise anchored as at 26 within the recess of groove 21. At this time handle 25 used for maintaining ring 20 in position during the above operations may be removed as by cutting.

Body 19 is provided with a recess 27 for the mounting of a corrective lens 28 of any suitable material. Methyl methacrylate with diglycol derivative used for hardening purposes has been found suitable.

The eye is suitably examined for refractive error and the corrective lens 28 is introduced into the recess 27 of body 19 already secured to the cornea 12. Suitable means are used for attachment of lens 28 such as use of an adhesive or solvent for fusion.

It is to be noted that retention ring 20 is serrated or roughened for fluid tightness as indicated at numeral 29 in Figure 9, and that the inner peripheral area of body 19 may also be roughened as shown in Figure 9 by reference numeral 30.

By reference to Figure 3a, the retention ring may take the form of a netted or screen-mesh structure 31 having openings 32 therein for mounting and projection of sutures 23.

The roughened textures described stimulate the necessary inflammatory reaction for exudates for purposes of adhesion, regeneration and repair so that the sutured joint between body 19 and ring 20 will become fluid-tight.

As shown best in Figure 2, there is provided the equivalent of a relief for internal fluid pressure relief in the form of an opening 33 adapted to communicate with the aqueous humor and contains a suitable filter plug 34.

In Figure 10 structure is shown omitting the retaining ring 20 and wherein the suture is anchored in the cornea itself adjacent the opening 17. Further, in Figure 10 the corneal body 19 may be on the inside of the cornea as shown in phantom lines.

I wish it distinctly understood that minor changes and modifications in materials used and in the integration, relationship, size of parts and technique may all be resorted to without departing from the spirit of the invention and the scope of the appended claims.

I claim:

1. In a synthetic and functional corneal fabrication for a corneal opening resulting from a sectional corneal removal, comprising a transparent plastic member, a retaining ring and suture ends mounted therein and projecting therefrom, said ring being adapted to underlie the corneal rim area adjacent said opening and said sutures being adapted to penetrate through the corneal rim area adjacent the opening and engage the peripheral portion of the transparent plastic member.

2. In a synthetic and functional corneal fabrication as set forth in claim 1 and a corrective lens and means to secure said lens to the transparent plastic member.

References Cited in the file of this patent

UNITED STATES PATENTS

| | | |
|---|---|---|
| 2,517,523 | Batchelder | Aug. 1, 1950 |
| 2,714,721 | Stone | Aug. 9, 1955 |
| 2,754,520 | Crawford | July 17, 1956 |